US008762932B2

(12) United States Patent
Narayana et al.

(10) Patent No.: US 8,762,932 B2
(45) Date of Patent: Jun. 24, 2014

(54) SYSTEMS AND METHODS FOR CONTEXT UNDERSTANDING FOR DEVELOPING A SOFTWARE SOLUTION FOR A PROJECT

(75) Inventors: Mandaleeka Guru Prasada Lakshmi Narayana, Hyderabad (IN); Supriya Kummamuru, Hyderabad (IN); Nistala Padmalata, Hyderabad (IN); Pillutla Narasimha Murthy, Hyderabad (IN)

(73) Assignee: Tata Consultancy Services Limited (IN)

( * ) Notice: Subject to any disclaimer, the term of this patent is extended or adjusted under 35 U.S.C. 154(b) by 34 days.

(21) Appl. No.: 13/490,293

(22) Filed: Jun. 6, 2012

(65) Prior Publication Data
US 2013/0332896 A1    Dec. 12, 2013

(51) Int. Cl.
*G06F 9/44*    (2006.01)

(52) U.S. Cl.
USPC ............ 717/101; 717/100; 717/102; 717/103

(58) Field of Classification Search
None
See application file for complete search history.

(56) References Cited

U.S. PATENT DOCUMENTS

| | | | | |
|---|---|---|---|---|
| 7,382,371 | B1 * | 6/2008 | Ciabarra | 345/440 |
| 7,735,068 | B2 * | 6/2010 | Siddaramappa et al. | 717/128 |
| 8,413,088 | B1 * | 4/2013 | Armbruster et al. | 716/106 |
| 2004/0111702 | A1 * | 6/2004 | Chan | 717/113 |
| 2007/0130561 | A1 * | 6/2007 | Siddaramappa et al. | 717/106 |
| 2008/0163173 | A1 * | 7/2008 | Bauer et al. | 717/122 |
| 2011/0209149 | A1 * | 8/2011 | Simitsis et al. | 718/100 |
| 2012/0060141 | A1 * | 3/2012 | Demant et al. | 717/101 |
| 2012/0192151 | A1 * | 7/2012 | Parkes et al. | 717/120 |
| 2013/0016875 | A1 * | 1/2013 | Boulila | 382/103 |

OTHER PUBLICATIONS

Narayanan, R., et al., "Creating Human Resources for Information Technology—A Systematic Study", (Version 2.0), Submitted to NASSCOM IT workforce development group, [online]. Retrieved from the Internet: <URL: http://www.iitmk.ac.in/edugrid/download/nasscom_whitepaper.pdf>, (Jan. 2005), 44 pgs.

Subramanian, K. V., "Holistic Approach to Consulting", [online]. [retrieved Jun. 28, 2011]. Retrieved from the Internet: <URL: http://subramaniankv.articlealley.com/holistic-approach-to-consulting-1477020.html>, (2011), 9 pgs.

* cited by examiner

*Primary Examiner* — Don Wong
*Assistant Examiner* — Roberto E Luna
(74) *Attorney, Agent, or Firm* — Schwegman Lundberg & Woessner, P.A.

(57) ABSTRACT

A method and a system for facilitating holistic comprehension of a project and simultaneously reducing human effort involved in comprehending such project are disclosed. The method further comprises generating a cybernetics influence diagram (CID) using the plurality of parameters. The CID is indicative of a relationship of at least one parameter of a plurality of parameters with at least another parameter of the plurality of parameters. The method further comprises identifying at least one parameter from amongst the plurality of parameters as key thrust areas (KTAs) based upon threshold rules. The threshold rules are based upon the relationship of the parameters with one another. The method further comprises receiving a set of stakeholder objectives from a user. The set of stakeholder objectives is associated with the project. The method further comprises generating a traceability matrix template to facilitate mapping of the KTAs against the set of stakeholder objectives.

10 Claims, 5 Drawing Sheets

SYSTEMS AND METHODS FOR CONTEXT UNDERSTANDING FOR DEVELOPING A SOFTWARE SOLUTION FOR A PROJECT

TECHNICAL FIELD

The present subject matter described herein, in general, relates to systems and method for context understanding in order to develop a software solution for a project.

BACKGROUND

Information Technology (IT) organizations are in a business of developing software solutions for a gamut of projects. In order to develop software solutions for such projects, the IT organizations need to understand the context of these projects holistically. The context of a project may be understood as the requirements that the software solution being designed for a project needs to be fulfilled. For example, a project of providing Unique Identification (UID) number to all the citizens of India is massively complex and it is imperative to understand each and every aspect of this project entirely in order to design a software solution for this project. In order to understand such projects various manual approaches are typically used. For example, flowcharts, algorithms, cause and effect diagrams, and other methods may be used to understand such projects.

SUMMARY

This summary is provided to introduce concepts related to systems and methods for facilitating context understanding for developing a software solution for a project, and the concepts are further described below in the detailed description. This summary is not intended to identify essential features of the claimed subject matter nor is it intended for use in determining or limiting the scope of the claimed subject matter.

In one implementation, a method for facilitating context understanding for developing a software solution for a project is disclosed. The method further comprises generating a cybernetics influence diagram (CID) using a plurality of parameters. The CID is indicative of a relationship of at least one parameter of a plurality of parameters with at least another parameter of the plurality of parameters. The method further comprises identifying at least one parameter from amongst the plurality of parameters as a key thrust area (KTA) based upon threshold rules. The threshold rules are based upon the relationship of the parameters with one another. The method further comprises receiving a set of stakeholder objectives from a user. The set of stakeholder objectives is associated with the project. The method further comprises generating a traceability matrix template to facilitate mapping of the KTA against the set of stakeholder objectives.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
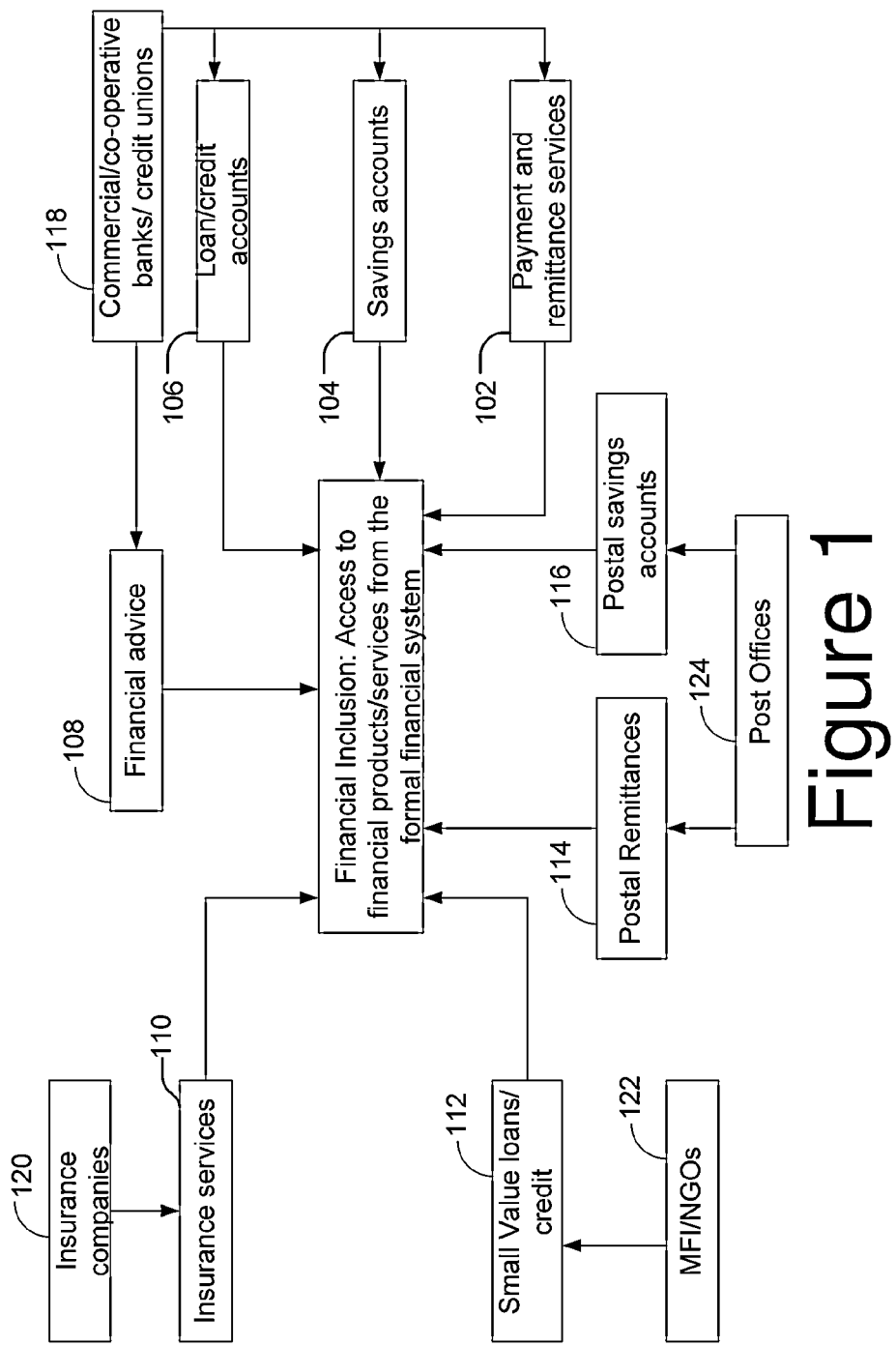
FIG. 1 shows an example of a project taken up by an IT organization, in accordance with an embodiment of the present disclosure.

Systems and methods for facilitating context understanding for developing a software solution for a project and simultaneously reducing human effort involved in comprehending such project are described. In one implementation, an Information Technology (IT) organization may need to develop software solutions for various projects ranging from simple to overly complex and gigantic ones. These projects may include business contexts, problems associated with such business contexts, needs of the business context, or any other task needing a software solution. Such projects have to be understood holistically from a plurality of vantage points. For example, Unique Identification (UID) project is a project of providing UID number to more than a billion people in India and is overly complex considering the diversity of people living in India, and therefore this project of providing a UID number must be understood in its entirety before one or more software solutions may be developed to facilitate the UID project. Further, in various projects, complexities may arise due to involvement of a large number of stakeholders, each having numerous requirements that the software solution may be required to cater to.

Conventionally, IT organizations use several models to facilitate building software solutions for such projects. However, gathering business requirements for the project has often been overlooked in terms of robust techniques and methodologies. In order to gather business requirements, several techniques have been used conventionally. These techniques included developing cause and effect diagrams, flowcharts, and algorithms of important aspects of the projects in order to understand the project. These techniques focused on capturing the business requirements from a limited stakeholder perspective. Although these techniques helped in capturing a lot of data, comprehending this data was a problem due to the haphazard way of collection of this data. Further, these techniques involve a lot of human effort and time. Furthermore, these techniques do not provide holistic, meticulous, and systematic way of comprehending projects that may be complex in nature. Moreover, these techniques are unable to extract information about each and every aspect of the project. Therefore, the use of such techniques is inefficient, and leaves gaps and challenges in understanding the projects. These gaps and challenges result in a lack of in-depth knowledge of the project, thereby resulting in a plurality of issues. The plurality of issues includes rework during later stages of software solution development for the project, and an increase in cost, resources, and time to deliver such software solutions. In some scenarios, such challenges may also lead to shelving of the projects. Further, such gaps in the understanding of the project may leave a negative impression on client's mind about the IT organization.

In order to avoid such issues, the present subject matter provides a method and a system for facilitating holistic comprehension of a project and simultaneously reducing human effort involved in comprehending a project for which a software solution is to be developed. Further, the method and system facilitate meticulous and systematic comprehension of such projects. In one implementation, the present subject matter requires a user to provide a plurality of parameters associated with the project. The plurality of parameters provides specific details about the project and includes relevant empirical and theoretical information about the project. In one example, if the project is to provide UID numbers to all Indians, then the plurality of parameters may include details relating to agents who may be involved in generating the UID numbers, a list of documents required from the people for the generation of UID number, centers to be chosen for UID generation, techniques to avoid fraudulent activities, salary of agents, and the like.

Using the plurality of parameters, a cybernetics influence diagram (CID) may be generated. A CID is a qualitative model or diagram which helps to understand a context of the project for which a software solution is to be designed. The CID is generated using the plurality of parameters. Further, the CID considers various perspectives and aspects of the project from a wide range of sources and people with roles in the project. These perceptions and aspects are captured in the form of parameters with qualitative relationship between them to depict in a graphical format as CID. Further, the CID is based upon influences of the parameters on one another and provides a holistic perspective of the project and enables the organization to refine one or more issues associated with the project. Furthermore, based upon the CID, certain Key Thrust Areas (KTAs) may be indentified. The KTAs are indicative of key issues that need to be addressed for successful implementation of the project.

Along with the generation of the CID, a stakeholder framework associated with the project may also be generated based upon a user input. The stakeholder framework provides a basis for understanding the project through a stakeholder lens. The stakeholder framework comprises identifying stakeholders involved in the project, needs associated with the stakeholders, system factors that can be altered, and constraints that come in the way of fulfilling the needs. Further, the stakeholder framework may be used to capture internal as well as external perspective of the project. Based upon the stakeholder framework, a set of stakeholder objectives may also be derived systemically. Each stakeholder objective of the set of stakeholder objectives satisfies one or more needs of the stakeholders either by overcoming a constraint or by changing an alterable. Referring to the example of the UID project, the stakeholders that are involved in the project may include representatives of the government of India, the IT service provider who is allocated the task of developing the software solution for the UID project, the people who will be employed as agents for working on this project, and the individuals for whom the UID numbers will be generated.

Subsequently, based upon the CID and the stakeholder framework, a traceability matrix template may be generated automatically. The traceability matrix template facilitates mapping of the key thrust areas against the set of stakeholder objectives. Mapping of the key thrust areas against the set of stakeholder objectives provides information about potential addressing of one or more KTAs by one or more stakeholder objectives. The traceability matrix template ensures systemic traceability between the CID and stakeholder framework and validates the context understanding of the project from both the CID and stakeholder framework. Further, the traceability matrix template may also help in identifying other focus areas which may have been missed out while detailing out the CID and were important from stakeholder perspective.

Therefore, it may be understood that the present subject matter provides a system and a method for facilitating holistic comprehension of a project by furnishing two techniques, namely, CID and stakeholder framework. Further, the system and method provide templates and predefined rules for reducing human effort involved in comprehending such project. Further, the system and the method may also be used to chart out a roadmap for developing a software solution for various projects.

While aspects of described system and method for facilitating holistic comprehension of a project and simultaneously reducing human effort involved in comprehending such project may be implemented in any number of different computing systems, environments, and/or configurations, the embodiments are described in the context of the following exemplary system.

Referring now to FIG. 1, a specific example of a project taken up by an IT organization is shown. The project, namely, financial inclusion is related to providing access to financial products/services from a formal financial system to thousands of people living in remote areas in India. Although, the present subject matter is explained considering the project to be financial inclusion (FI), it may be understood by a person skilled in the art that the system and method described herein may be applied to any other project. In the present example, FIG. 1 provides a scope, boundary, and a descriptive scenario of the project i.e., the FI. FI is an initiative of the Indian government to deliver banking services, such as access to payments and remittance services 102, savings account 104, loans 106, financial advice 108, insurance services 110, small value loans 112, postal remittances 114, and postal savings accounts 116 as shown in FIG. 1. These banking services may be provided by various service providers, such as banks 118, insurance companies 120, Mutual Fund Investment/Non-Governmental Organizations 122, and post offices 124. Further, these banking services are delivered at an affordable cost to a vast section of under privileged, disadvantaged, and low income group in India.

With a purpose of providing the above mentioned banking services, the Reserve Bank of India (RBI) permitted banks to use intermediaries as Business Facilitators (BF) or Business Correspondents (BC) for providing financial and banking services to such people. The BCs should conduct banking business as agents of the banks at places other than the bank premises. The banks should be given a mandate to provide financial services in 73000 villages, each with population of more than 2000. The project has a mandate to provide banking services to more than 30 million unbanked people across India. The project is a bit different from the typical projects that are done by IT companies as it involves numerous external stakeholders like RBI, banks, BCs, and village administration which has strong influence. Since this is a pan India project, it should be more organized and standard processes and procedures are required for its implementation.

Given the enormity of the project, the banks may either outsource the implementation of the project to an IT company for developing a software solution for managing the complete project or may develop the software solution within the bank with the help of a software team. The present subject matter may be explained considering that the software solution for the project is developed by an IT organization. As the IT organization is to implement the project, the IT organization may partner with different organizations to provide BC services. These organizations should select BC agents and BC coordinators following the RBI guidelines for doing so. The BC agents should work on behalf of banks in the unbanked areas. Further, the BC agents should be imparted training about various business processes, financial products/services, use of technology delivery mechanisms, reporting of details to bank branches, and the like.

Every BC agent should be attached to a bank branch which is known as bank base branch for that BC agent. Once recruited by the bank, the BC agent should be given a Point of Sale (POS) device to do banking operations. The POS device may have a webcam and a finger print reader. Further, every POS device may be loaded with a software application that is customized as per bank and the POS device. In order to enroll a customer for banking, the BC agent should collect customer details by following Know Your Customer (KYC) guidelines, getting an Account Opening Form (AOF) filled, collecting an identity proof (photocopy) and one passport size photo of the customer. The customer details may also include finger prints (at least 6) and photograph of the customer, both of which may be captured using the POS device. After the customer detail is registered in the POS device, an acknowledgement receipt should be sent to the customer regarding the same. The customer details should either be transferred to a server of the IT organization or should be collected by a BC coordinator in a hard drive.

Once or twice a week, a BC coordinators should also visit the villages and collect the filled AOFs from the BC agents. The BC coordinators should also extract the customer details from the POS device possessed by the BC agents. While the AOF should be submitted to the bank base branch, the customer details should be sent to the server of the IT organization. Bank officials should validate the customer details present on the server against the physical AOFs and open the account. A list of all the people for whom the account is open should be sent to the IT organization for generating smart cards for the customers. The smart cards should be sent back to the BC agents who should distribute the smart cards and activate them after matching the customers' finger print with the fingerprints stored in the smart cards. Once the cards are distributed, the customers should be able to perform all the banking services shown in FIG. 1. Example of the banking services may include services related to savings accounts, balance enquiry, mini statement, cash deposit, cash withdrawal, multiple debits/credits transfer, remittance, funds transfer, pension payments, other governmental disbursals, account closure, general Purpose Credit Card, loan/OD, loan disbursement, repayment, recovery, bill payments, sale and servicing of Insurance products, and the like.

Therefore, it may be understood that before a software solution may be developed for a project; a scope, a boundary, and a descriptive scenario of the project may be illustrated as shown in FIG. 1. Based upon the preliminary understanding of the project from FIG. 1, a Cybernetics Influence Diagram (CID) may be generated as shown in FIG. 2.

Figure 2A:
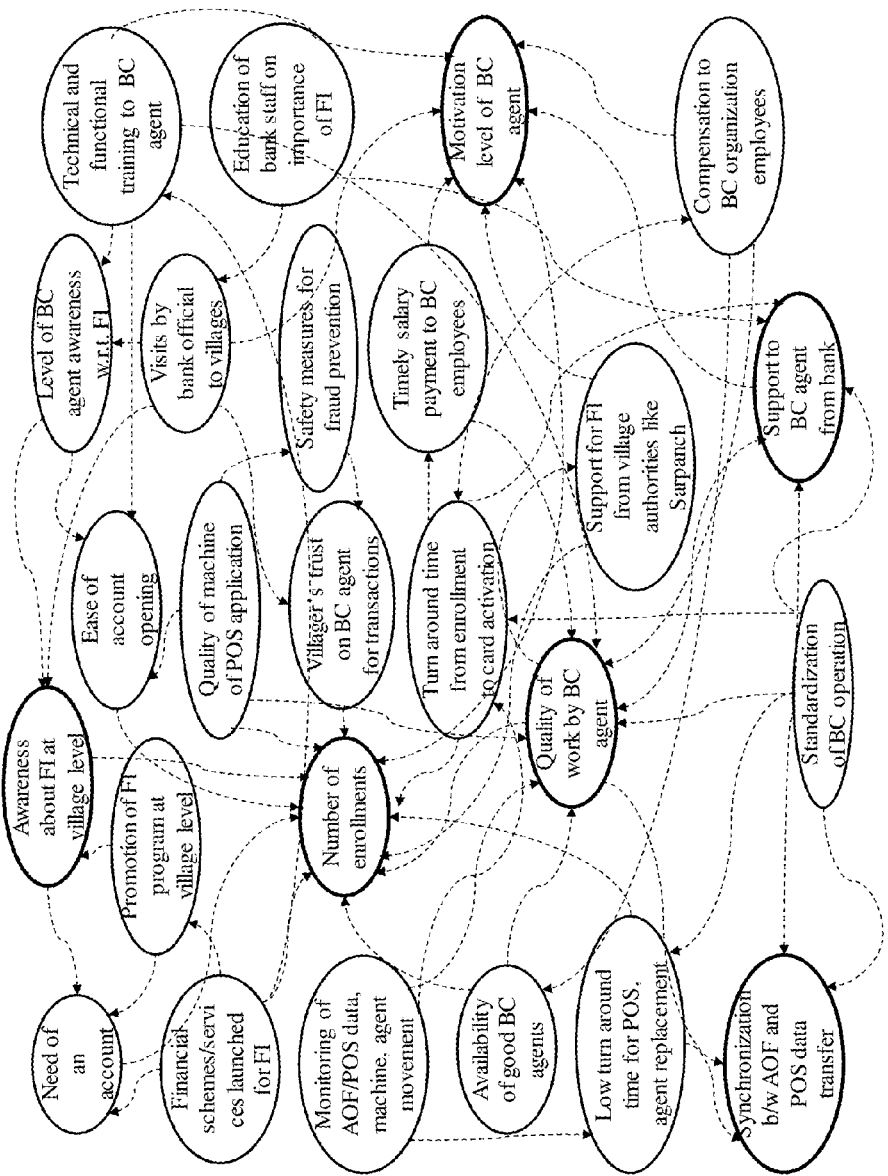
FIG. 2A shows a Cybernetics Influence Diagram (CID) for the project shown in FIG. 1, in accordance with an embodiment of the present disclosure.
Figure 2B:
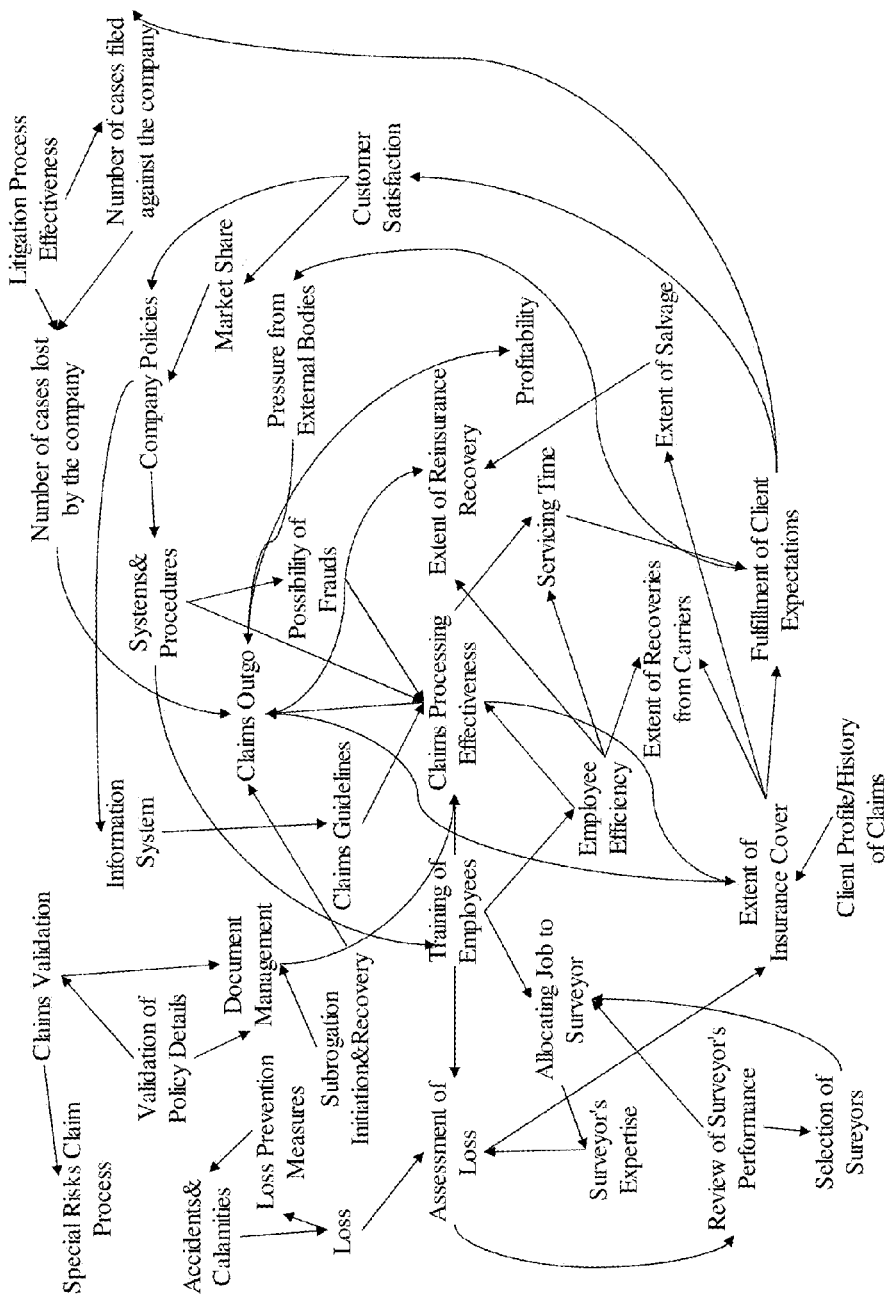
FIG. 2B shows a Cybernetics Influence Diagram (CID) for another project, in accordance with an embodiment of the present disclosure.

Referring to FIG. 2A, a CID for the project FI is shown, in accordance with an embodiment of the present subject matter. Although, in the present embodiment, the CID is generated for the project related to FI, it may be understood that the CID may be similarly generated for any another project, such as for 'claim processing' in an insurance company, as shown in FIG. 2B. A CID, unlike a cause and effect diagram, is a qualitative model or diagram which helps to understand a context of the project for which a software solution is to be designed. The CID captures the project in hand and helps in understanding the project in form of a diagram as shown in FIGS. 2A and 2B. The CID depicts a collection of plurality of parameters associated with the project. The CID also depicts influences of the plurality of parameters on one another. Entities such as enterprise, person, place or things may be referred to as the plurality of parameters if these entities have a significant impact or are impacted significantly in the project. The CID may help the IT organization to reflect on or refine their ideas regarding the project. Further, the CID guides careful problem construction through broadening of issues until they can be explained. The CID helps the IT organization to model the project holistically in a short span of time and identifying pain areas, inter alia, in the project.

In order to generate a CID, at first, a problem description document may be prepared. The problem description document comprises the plurality of parameters which are key elements associated with the project. The plurality of parameters may be derived by asking a set of questions relating to the project. These questions may revolve around, how, what, where, when, who, and why. These questions may help to get to the core of the project. In order to get to the core of the project and to identify all the parameters, one may start with a logical point. For example, the FIG. 1 highlights a main objective of the FI project. The main objective is to provide banking services to people in remote areas. In order to fulfill this main objective, the plurality of parameters may be identified. In one example, 'providing a bank account' may be required to fulfill this main objective, thus providing a bank account is a logical point to start with and is one of the plurality of parameters shown in FIG. 2A. In order to identify other parameters, the IT organization may ask, who needs an account, how can the account be provided, who all should be involved in providing the account, what should be the compensation of people involved in providing the account, how to maintain their motivation, how to make the process of providing accounts fraud free, and many other such questions to arrive at other parameters. It may be understood that as and when more and parameters are identified, more and more questions may be pointed on to these parameters to identify even more parameters. Further, the questions may be asked to capture only key elements and their strong and direct relationships.

While identifying the parameters, influences or relationships between the parameters may also be determined. In one implementation, influence of one parameter on the other may be determined. This may be done by starting at some logical point which may be a key to the project and build upon it. For example, the parameter 'need an account' would influence 'number of enrollments,' therefore an arrow originating from 'need an account' may go to the 'number of enrollments' as shown in FIG. 2A. Similarly, the parameter 'need an account' may get influenced by certain parameters, such as 'financial schemes/services launched for FI,' promotion of FI at village level,' and 'awareness about FI at village level,' therefore the arrows may point towards the parameter 'need an account' from these three parameters. Similarly, the parameter 'number of enrolments' may be influenced by the certain parameters, such as 'ease of account opening,' quality of machine of POS application,' 'financial schemes/services launched for FI,' 'availability of good BC agents,' and many other such parameters. Therefore, these parameters point the arrows towards the parameter 'number of enrolments.' Therefore, the CID provides a holistic view of all the parameters associated with the project and also depict the influences of the parameters on one another as shown in FIGS. 2A and 2B.

After the CID is generated, the CID may be analyzed to identify feedback loops and Key Thrust Areas (KTAs). The feedback loop provides an insight on pain areas of the project. If starting from any parameter A, a direction of influence/arrow is traced and leads back to the same parameter A, it is a feedback loop. Therefore, it may be assumed that parameter A is a pain area and necessary interventions may be needed to address the parameter A.

Further, as mentioned above, the CID may also be used to identify KTAs. KTAs are the vital parameters in the plurality of parameters. The KTAs are the key points or focus areas to be considered or addressed for the developing a software solution for the project. KTAs may be key business requirements of the project in form of functional, non functional, and other requirements. The KTAs may be of two types, namely, merge points and burst points. The merge points and the burst points may be identified based upon certain threshold rules. In one implementation, according to these threshold rules, the merge points are those parameters where at least three arrows converge, while the burst points are the parameters from which at least two arrows originate or diverge. However, in another implementation, the threshold rules may be different. In one example, for a parameter X to be a merge point, the threshold rules may require that the parameter X be influenced by at least three other parameters, i.e., the parameter X should have at least three inward pointing arrows. Similarly, for a parameter Y to be a burst point, the threshold rules may require that the parameter Y should influence at least two other parameters, i.e., the parameter Y should have at least two outward pointing arrows. In the present example shown in FIG. 2A, the parameters 'awareness about FI at village level,' 'number of enrolments,' quality of work of BC agents' are some of the merge points having at least three inward arrows as shown in FIG. 2A. Whereas, the parameters 'standardization of BC operation,' 'compensation of BC organization employees,' 'visits by bank official to villages' are some of the burst points having at least two outward arrows. The KTAs identified in FIG. 2A are, the number of enrollments, quality of work by BC agent, motivation level of BC agent, support to BC agent from the bank, synchronization b/w AOF and customer details stored in the POS devices, standardization of BC operations, financial schemes/services launched for FI, quality of machine of POS application, and visits by bank official to villages.

In one implementation, the CID may be generated based upon the user input which may be provided, for example, as an influence matrix. The influence matrix captures influences between the parameters in a form of a table. The influence matrix may depict influence of one parameter on other parameters. In one example, an influence matrix shown in Table 1 below may be uploaded onto the system (shown in FIG. 3) so that the system may generate the CIDs shown in FIGS. 2A and 2B:

TABLE 1

Influence matrix

|    | P1  | P2  | P3  | P4  |
|----|-----|-----|-----|-----|
| P1 | NO  | YES | YES | YES |
| P2 | NO  | NO  | YES | YES |
| P3 | NO  | NO  | NO  | YES |
| P4 | YES | NO  | NO  | NO  |

The influence matrix shown as Table 1 includes parameters P1 to P4 of the plurality of parameter and the influences of parameters P1 to P4 on one another. In the present implementation, the influence matrix may be used to extract the merge points, burst points, and the feedback loops. In order to determine merge points from the influence matrix, the sum of all 'YES' in a column X corresponding to a parameter in the column X is determined. For example, in the fourth column, there are 3 'Yes' corresponding to P4. Therefore, it may be inferred that P4 is a merge point with indegree 3 as three other parameters are influencing P4. Similarly, P3 is influenced by 2 other parameters and therefore the indegree is 2. Further, in order to determine burst points from the influence matrix, the sum of all 'YES' in a row X corresponding to a parameter in the row X is determined. For example, in the first row, there are 3 'Yes' corresponding to P1. Therefore, it may be inferred that P1 is a burst point with outdegree 3 as P1 is influencing 3 other parameters. Similarly, P2 is influencing 2 other parameters and therefore the outdegree is 2. Furthermore, in order to determine feedback loops from the influence matrix, consider each parameter in each row. For example, consider the parameter P1 in the first row. Against P1, there is a 'YES' in P2 in the first row. Further, there is a 'YES' in P3 and P4 in the same first row. Therefore, there exists a feedback loop from P1→P2→P3→P4→P1. Similarly, the other feedback loop i.e., P1→P2→P4→P1 may be determined.

Uploading the influence matrix in the system (shown in FIG. 3) may assist in generation of the CID. The influence matrix may help in deriving the following inferences:
Merge Points: P4 (indegree 3), P3 (indegree 2)
Burst Points: P1 (outdegree 3), P2 (outdegree 2)
Feedback loop: P1→P2→P4→P1, and P1→P2→P3→P4→P1

While the CID is generated and analyzed, a stakeholder framework may also be generated simultaneously. The CID and the stakeholder framework help to validate the understanding of the project. The stakeholder framework provides a basis for understanding a context of the project through a stakeholder lens. Therefore, it may be understood that the project in hand may be understood using the CID as well as using the stakeholder framework, both of which may be used to identify any gap in understanding of the project. The stakeholder framework identifies various stakeholders associated with the project, their expectations from the project, and challenges faced to fulfill those expectations. The stakeholder framework also captures internal as well as external perceptions of a problem situation associated with the project.

The stakeholder framework has four dimensions. A first dimension is associated with the stakeholders involved in the project, a second dimension is associated with the needs of each stakeholder in view of the main objective, a third dimension is associated with alterable that the IT organization believes it can change or alter to achieve the main objective, and a fourth dimension is associated constraints that the IT organization thinks it can not change. As the four dimensions include Stakeholders, Needs, Alterables, and Constraints, an analysis of the project done in these four dimensions may be referred to as SNAC analysis. The SNAC analysis is used to generate a comprehensive and exhaustive set of stakeholder objectives for the IT organization.

A first step in the SNAC analysis is to prepare a descriptive scenario for the IT organization about the project in hand. A descriptive scenario is a document that furnishes information relevant to the IT organization. The descriptive scenario may be screened for the plurality of parameters which are key elements and have significant relevance to the project described in the descriptive scenario. Next step in the SNAC analysis is to classify the parameters into four dimensions, namely, Stakeholders, Needs, Alterables, and Constraints. After the stakeholder framework is defined into four dimensions, the set of stakeholder objectives may be determined for the stakeholder framework. The set of stakeholder objectives is derived based on the criteria that each stakeholder objective of the set of stakeholder objectives satisfies one or more needs of the stakeholders either by overcoming a constraint and/or by changing an alterable. In one implementation, certain principles may be followed for defining the set of stakeholder objectives, the principles are: stakeholder objectives defined should be specific for realization by the IT organization, stakeholder objectives should be realizable, stakeholder objectives should be derived from needs of stakeholders, stakeholder objectives should be simple, measurable, achievable, relevant, and time bound. Further, in order to formulate the set of stakeholder objectives, certain steps may be followed: At first, stakeholders for achieving the main objectives of the project are identified. Subsequently, needs, alterable, and constraints are identified and validated by the stakeholders. Then the set of stakeholder objectives is defined based upon a criterion that one or more needs may be met by overcoming a related constraint and/or tweaking one or more alterables.

A generic criterion for defining each stakeholder objective of the set of stakeholder objectives is:

Infinitive Verb+Objective of Infinitive+Qualifying Phrase or Constraint

In order to understand this, the following table may be considered:

| Stakeholder | Needs | Alterables | Constraints |
|---|---|---|---|
| Tribal | Improved quality of life and better | Quantity of MFP collected/procured Replenishment of | Quantity of MFP procured Forest potential |
| | livelihood opportunities | forests Paying Remunerative Prices Regularity of operations in DR Depots | Funds for MFP Funds for ECs (Essential Commodities) Funds for DRs (Daily Requirements) |

The table shown above captures a stakeholder, his need, related alterables, and constraints. As each stakeholder objective may satisfy a 'need' of the stakeholder either by overcoming a constraint or by changing an alterable, the form of a stakeholder objective may be defined using the following:

Infinitive Verb+Objective of Infinitive+Qualifying Phrase (maybe a Need) or Constraint or Alterable i.e., To+Improve+Quality of Life of the Tribal by Paying Remunerative Prices Table 2 shown below illustrates the SNAC analysis for the project related to FI discussed in FIG. 1. As discussed above in FIG. 1, various stakeholders may be involved in fulfilling the main objectives of the project. The main objectives may be fulfilled by laying out 'needs' in the SNAC analysis shown in Table 2. For example, the 'need' to get easy and safe access to banking services and the 'need' to save and invest money for future use may help to fulfill the main objective of providing banking services to the people:

TABLE 2

| | | Stakeholder framework/SNAC analysis for FI | | |
|---|---|---|---|---|
| . | Needs | Constraints | Alterables | Stakeholder objectives |
| Unbanked Population | To get easy and safe access to banking services | Low awareness about BC agent model & related banking services and financial products | Ask the village leader and BC agent to call the bank officials and explain the benefits of banking services specially the BC agent model | To provide better compensation to BC agents, coordinators, Technically Skilled Persons and to pay of salaries on time |
| | | | | To standardize BC operations (at agent, coordinator and district manager level) |
| | To get access to multiple government schemes like NREGA, Scholarship schemes etc. | Lack of realization of benefits of opening an account through BC agent | Proactively enroll through BC agent | To comprehensively monitor AOF/POS data, machines, agents and cards |
| | | | | To reduce turnaround time for POS and agent replacement |
| | To save and invest money for future use | Lack of trust on BC agent | Bank to use their channels for enrollment | To reduce turnaround time from enrollment of customer to card distribution and activation |
| | | | | To create a robust FI application that can cater to added functionalities of FI program |
| | To get services through trustworthy channel | Since the projects are still in enrollment phase, people have not seen a working mode | Use the UID Platform for enrollment | To ensure good quality of POS machine & its application |
| | | | | To ease the process of opening an account |

TABLE 2-continued

Stakeholder framework/SNAC analysis for FI

| | Needs | Constraints | Alterables | Stakeholder objectives |
|---|---|---|---|---|
| | A channel to receive and send money (migrant workers) | Difficult to identify Bank with an agent | | To launch of relevant financial schemes meant for rural customers as and when needed |
| | | | | To increase the number of visits by bank officials |
| | | Identity in terms of documents to support birth date, proof of residence | | To increase support for BC agent and coordinator from bank officials and village authorities like the village leader |
| | | | | To increase the trustworthiness of BC Agent among villagers |
| | | | | To improve technical and functional training given to BC agents, coordinators |
| BC Organization | To provide banking services to rural population, on behalf of banks | Difficult to find motivated BC agents and coordinators at present salary levels (very low) | Invest in training of BC agents and coordinators | To increase awareness of BC agents and BC coordinators |
| | | | | To improve the process of selection of good BC agents |
| | To establish a financial service organization as a leading provider in the field of FI. | Lack or absence of training facility for BC agent | Follow uniform process across geographies | To promote FI till Village level |
| | To create a nation wide organization with village level reach, that can cater to multiple social sector projects like FI, UID etc. | Difficult to reach each and every village on day regular basis while keeping the costs under control | Do a thorough background check of BC agent and coordinator as they carry machine and money | |
| | | Geographical, connectivity, regional and village level issues create a lot of hindrance in getting people enrolled | Keep the BC agents and coordinators motivated by launching various programs | |
| | | Lack of proper MIS system in place | Create a communication channel to pass on a uniform message to BC agents and coordinators across organization | |
| | | Full support of banks not available | The BC coordinators should work closely with bank officials to keep them updated about village level activities and seek their assistance | |
| | | Poor synchronization between hard data and soft data movement | | |
| TCS | To create safe and efficient business model to provide banking services to rural population | Although TCS is given end to end responsibility for executing FI program it is using services of BC organizations like SEED etc., making it difficult to | Define a robust Program Management structure for implementing this project | |

TABLE 2-continued

Stakeholder framework/SNAC analysis for FI

| Needs | Constraints | Alterables | Stakeholder objectives |
|---|---|---|---|
| | monitor the program | | |
| To establish itself as a leading service provider in the field of FI | No past experience in doing this kind of work | Create a flexible and robust POS application that is easy to operate and keeps the data safe | |
| To provide low cost solution for enabling FI for banks and at the same time ensuring that business remains profitable | TCS associates are not trained to handle the project involving village level coordination | Recruit people with experience in social sector | |
| To meet the mandate given by the banks to TCS | Lack of monitoring infrastructure | Establish a district level organization to monitor BC organization, coordinate with banks and implement plans | |
| | Lack of contractual agreement with SEED making it difficult to keep tight control over processes | Create a standard MIS system to be used by multiple BC organizations | |
| | Lack of preparedness in term of application creation and hardware procurement | Create auditable SOPS and SLAs | |
| | | Invest in growth of multiple BC organizations and create more alternatives | |
| | Since this is high volume and low margin business, cost is a constraint | | |
| | | Focus on medium and long term planning rather than investing all the time on day to day operations that are anyways handled by BC organization | |
| | Lack of coordination between TCS, SEED and banks specially at district and village level | | |
| | | Work with POS vendor to provide quick support at district level | |
| | Too much dependence on a single BC organization i.e. SEED | | |
| | | Identify and engage with vendors who will meet stringent criteria for POS machines | |
| | No influence on the implementing stakeholders (BC Organization) | | |

TABLE 2-continued

Stakeholder framework/SNAC analysis for FI

| . | Needs | Constraints | Alterables | Stakeholder objectives |
|---|---|---|---|---|
| | | | Introduce the mobile phone model of operation | |
| Banks | To provide banking services to unbanked population at their doorstep | Lack of motivation at base branch level toward FI work | Create awareness about FI at block level branches | |
| | To keep the cost of providing banking services low | Most of the base branches have scarce staff making it difficult for them to visit the field on regular basis and educate people | Bank branch officer should regularly visit the villages | |
| | To launch multiple banking product means for rural market | Cost should be kept low to keep the FI program viable | Ask the bank staff to cooperate with BC organization | |
| | To create infrastructure to have a village level reach | Lack of accurate monitoring mechanism | Create financial training programs for bank officials as well as BC organization | |
| | To create awareness about financial services in rural areas | Lack of realistic Service Level Agreements (SLAs) and their enforcement | Make sure that KYC norms are strictly met | |
| | To ensure that transactions through BC model are secure | Most of the open account remains dormant | Launch attractive services for rural population and publicize them through multiple mediums | |
| | Low cost and stable funds | | Coordinate with other banks to market FI to convey the working model and benefits to rural population | |
| | To leverage the bottom of the Pyramid customers | | Create grievance redressal mechanism for people | |
| | | | Start the transactional services as soon as possible | |
| | | | Set targets at rural branch level and monitor consistently | |
| | | | Hire a third party for auditing purpose | |
| RBI and Ministry of Finance | Access to safe, easy and affordable credit and other financial services by the poor and vulnerable groups, disadvantaged areas and lagging sectors | Awareness among the intended audience | Keep a check on possible security threats, specially fraud from agent, as villagers are not fully aware of risks | |
| | To efficiently and effectively take government schemes like | Societal constraints in the intended environment | | |

TABLE 2-continued

Stakeholder framework/SNAC analysis for FI

| Needs | Constraints | Alterables | Stakeholder objectives |
|---|---|---|---|
| NREGA etc. to common people | (Photo ids, age details etc.) | | |
| | | Launch national level campaign for FI clearly explaining the working model and benefits | |
| To drive the banks to focus on financial inclusion | Physical constraints like roads, communication, transport and infrastructure etc | | |
| | | Give elaborate guidelines to banks of controls and check they need to exercise on TSP and BC organization | |
| Enables economically and socially excluded people to integrate better into the economy and actively contribute to development and protect themselves against economic shocks | Deadlines too tight and low level of preparedness at bank level | | |
| | | Flexibility on KYC norms and requirements for these accounts | |
| Payments due to workers of employment guarantee schemes to be paid through their bank accounts | Lack of motivation at the block level bank officials towards FI program | | |
| | Lack of monitoring mechanisms are micro level | | |

Subsequent to the generation of the stakeholder framework and identification of the KTAs, the system (shown in FIG. 3) may automatically generate a traceability matrix template to facilitate mapping of the KTAs against the set of stakeholder objectives. The traceability matrix template includes the KTAs on one axis and the set of stakeholder objectives on the other axis. The KTAs and the set of stakeholder objectives are aligned and validated using the traceability matrix template. The traceability matrix template ensures systemic traceability between the CID and stakeholder framework and validates the context understanding of the project from both the CID and stakeholder framework. Further, the traceability matrix template helps in identification of gaps, if any, in the set of stakeholder objectives for realizing the KTAs. The traceability matrix template may also help in identifying other focus areas which may have been missed out while detailing out the CID and were important from stakeholder perspective. Further, a congruence between the CID and the stakeholder framework leads to a systemic solution keeping in view needs from an environment and stakeholder perspective.

The traceability matrix template may be used by the IT organization to map stakeholder objectives to KTAs. If a stakeholder objective X is mapped to a KTA Y, then it would mean that the stakeholder objective X is capable of addressing the KTA Y. It may be understood that one stakeholder objective may be able to address more than one KTA. Therefore, one stakeholder objective may be mapped to more than one KTA. The Table 3 shows the traceability matrix template for the project associated with FI. In one example, Table 3 shows that the KTA 'motivation level of BC agent' may be addressed by the stakeholder objective, namely, 'to provide better compensation to BC agents, coordinators, technically skilled persons and to pay of salaries on time'. Similarly, the KTA 'financial schemes/services launched for FI' may be addressed by two stakeholder objectives, namely, 'to create a robust FI application that can cater to added functionalities of FI program' and 'to launch of relevant financial schemes meant for rural customers as and when needed.'

TABLE 3

Traceability matrix template

| Set of stakeholder objectives / KTAs | 1. Number of Enrollments | 2. Quality of work by BC Agent | 3. Motivation Level of BC Agent | 4. Support to BC Agent from bank | 5. Synchronization b/w AOF and POS data transfer | 6. Standardization of BC operations | 7. Financial schemes/ services launched for FI | 8. Quality of machine of POS application | 9. Visits by bank official to villages |
|---|---|---|---|---|---|---|---|---|---|
| 1. To provide better compensation to BC agents, coordinators, Technically Skilled Persons and to pay of salaries on time | | | | X | | | | | |
| 2. To standardize BC operations (at agent, coordinator and district manager level) | | X | | | | X | | | |
| 3. To comprehensively monitor AOF/POS data, machines, agents and cards | | | | | X | | | | |
| 4. To reduce turnaround time for POS and agent replacement | | | | | | | | | |
| 5. To reduce turnaround time from enrollment of customer to card distribution and activation | | | | X | | | | | |
| 6. To create a robust FI application that can cater to added functionalities of FI program | | | | | | | X | | |
| 7. To ensure good quality of POS machine & its application | | | | | | | | X | |
| 8. To ease the process of opening an account | | | | | | | | | |
| 9. To launch of relevant financial schemes meant for rural customers as and when needed | | | | | | | X | | |
| 10. To increase the number of visits by bank officials | | | | | | | | | X |
| 11. To increase support for BC agent and coordinator from bank officials and village authorities like village leader | | | | X | | | | | |
| 12. To increase the trustworthiness of BC Agent among villagers | | | | | | | | | |
| 13. To improve technical and functional training given to BC agents, coordinators | | | | | | | | | |
| 14. To increase awareness of BC agents and BC coordinators | X | | | | | | | | |
| 15. To improve the process of selection of good BC agents | | | X | | | | | | |
| 16. To promote FI till Village level | | | | | | | | | |

After the KTAs are mapped to the set of stakeholder objectives, IT organization may identify the KTAs which are not being addressed by any of the set of stakeholder objectives, i.e., gap analysis. If a KTA X is not addressed by any stakeholder objective of the set of the stakeholder objectives, then representatives/employees of the IT organization may go into a brainstorming session in order to come with new objective(s) capable of addressing the KTA X. This may be referred to as gap analysis.

Therefore, it may be understood that the combination of two techniques, namely, CID and stakeholder framework gives a more robust understanding of the project. However, since two techniques are used for analyzing the project meticulously, a system (shown in FIG. 3) may be required to assist the representative of the IT organization. Otherwise, the analysis will be a time consuming process and will be prone to manual errors.

Figure 3:
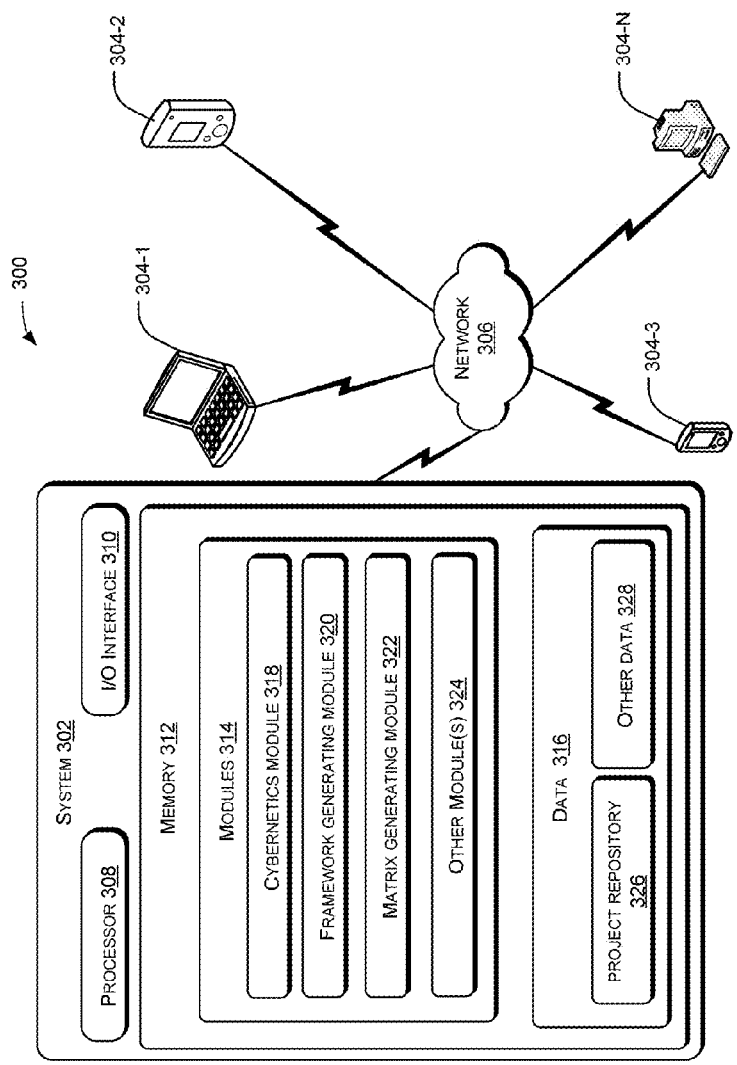
FIG. 3 illustrates a network implementation of a system for facilitating context understanding for developing a software solution for a project, in accordance with an embodiment of the present subject matter.

Referring now to FIG. 3, a network implementation 300 of system 302 for facilitating context understanding for developing a software solution for a project is illustrated, in accordance with an embodiment of the present subject matter. In one embodiment, the system 302 may be implemented in the organization, such as an Information Technology (IT) organization, a financial institution, a telecommunication organization, and the like. The present subject matter may be explained considering the organization to be an IT organization, however, it may be understood that the organization may be any other organization capable of developing software solutions for projects.

The system 302 may be implemented in a variety of computing systems, such as a laptop computer, a desktop computer, a notebook, a workstation, a mainframe computer, a server, a network server, and the like. It will be understood that the system 302 may be accessed by stakeholders through one or more client devices 304-1, 304-2, . . . 304-N, collectively referred to as client devices 304 hereinafter, or applications residing on client devices 304. Examples of the client devices 304 may include, but are not limited to, a portable computer, a personal digital assistant, a handheld device, and a workstation. The client devices 304 are communicatively coupled to the system 302 through a network 306.

In one implementation, the network 306 may be a wireless network, a wired network or a combination thereof. The network 306 can be implemented as one of the different types of networks, such as intranet, local area network (LAN), wide area network (WAN), the internet, and the like. The network 306 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 306 may include a variety of network devices, including routers, bridges, servers, computing devices, storage devices, and the like.

In one embodiment, the system 302 may include at least one processor 308, an I/O interface 310, and a memory 312. The at least one processor 308 may be implemented as one or more microprocessors, microcomputers, microcontrollers, digital signal processors, central processing units, state machines, logic circuitries, and/or any devices that manipulate signals based on operational instructions. Among other capabilities, the at least one processor 308 is configured to fetch and execute computer-readable instructions stored in the memory 312.

The I/O interface 310 may include a variety of software and hardware interfaces, for example, a web interface, a graphical user interface, and the like. The I/O interface 310 may allow the system 302 to interact with a user directly or through the client devices 304. Further, the I/O interface 310 may enable the system 302 to communicate with other computing devices, such as web servers and external data servers (not shown). The I/O interface 310 can facilitate multiple communications within a wide variety of networks and protocol types, including wired networks, for example, LAN, cable, etc., and wireless networks, such as WLAN, cellular, or satellite. The I/O interface 310 may include one or more ports for connecting a number of devices to one another or to another server.

The memory 312 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 312 may include modules 314 and data 316.

The modules 314 include routines, programs, objects, components, data structures, etc., which perform particular projects or implement particular abstract data types. In one implementation, the modules 314 may include a cybernetics module 318, a framework generating 320, a matrix generating module 322, and other modules 324. The other modules 324 may include programs or coded instructions that supplement applications and functions of the system 302.

The data 316, amongst other things, serves as a repository for storing data processed, received, and generated by one or more of the modules 314. The data 316 may also include a project repository 326, and other data 328. The other data 328 may include data generated as a result of the execution of one or more modules in the other modules 324.

In one implementation, the I/O interface 310 is configured to receive a plurality of parameters associated with a project. The plurality of parameters may be received from an employee of the IT organization. Along with the plurality of parameters, the employee may also provide relationships that the plurality of parameters has with one another. In one example, the plurality of parameters and their influences on one another may be provided to the system 302 in the form of the influence matrix shown in Table 1. Based upon the plurality of parameters and their relationships, the cybernetics module 318 may generate the cybernetics influence diagram (CID) shown in FIGS. 2A and 2B. The CID may be used for meticulous understanding of the project by deriving out a holistic picture of relationships between the plurality of parameters. In one implementation, the cybernetics module 318 may also identify at least one parameter from amongst the plurality of parameters as key thrust areas (KTAs) based upon the threshold rules defined above. The threshold rules are based upon the relationship of the parameters with one another. In one implementation, the CID may be stored in the project repository 326.

After the CID is generated, the project may also be understood from a stakeholders' perspective. In order to do so, the framework generating module 320 may facilitate generation of a stakeholder framework associated with the project based upon the user input. The user or the employee may give input to the system 302 for generating the stakeholder framework/ SNAC analysis as shown in Table 2 above. The stakeholder framework is indicative of at least one of stakeholders involved in the project, needs of the stakeholders, alterables associated with the project, and constraints associated with the project. Further, the stakeholder framework may also receive a set of stakeholder objectives associated with the project from the user. In one implementation, the stakeholder framework may be stored in the project repository 326. In one embodiment, the SNAC analysis may be done outside the system 302. In this embodiment, the system 302 may prompt the user to indicate a location and export the Table 2 from that location.

After understanding the project using the CID and the stakeholder framework, a gap analysis may be done. For performing the gap analysis, the matrix generating module 322 may automatically generate a traceability matrix template which facilitates mapping of the KTAs against the set of stakeholder objectives. In one implementation, the matrix generating module 322 may extract the KTAs from the CID and the set of stakeholder objectives from the stakeholder framework for generating the traceability matrix template shown in Table 3. After the traceability matrix template is generated, mapping of KTAs against the set of stakeholder objectives is performed, for example, based on user inputs from the employee of the IT organization. From the traceability matrix template, if it is observed that a KTA is left unaddressed by any of the stakeholder objectives, then the system 300 may generate a report to highlight the same. In one embodiment, the matrix generating module 322 is further configured to map the KTAs against the set of stakeholder objectives in the traceability matrix template based on mapping rules. The mapping rules may include word processing rules. In one implementation, the traceability matrix template may be stored in the project repository 326.

Therefore, it may be understood that the system 302 may be used for facilitating holistic comprehension of a project and simultaneously reducing human effort involved in comprehending such project.

Figure 4:
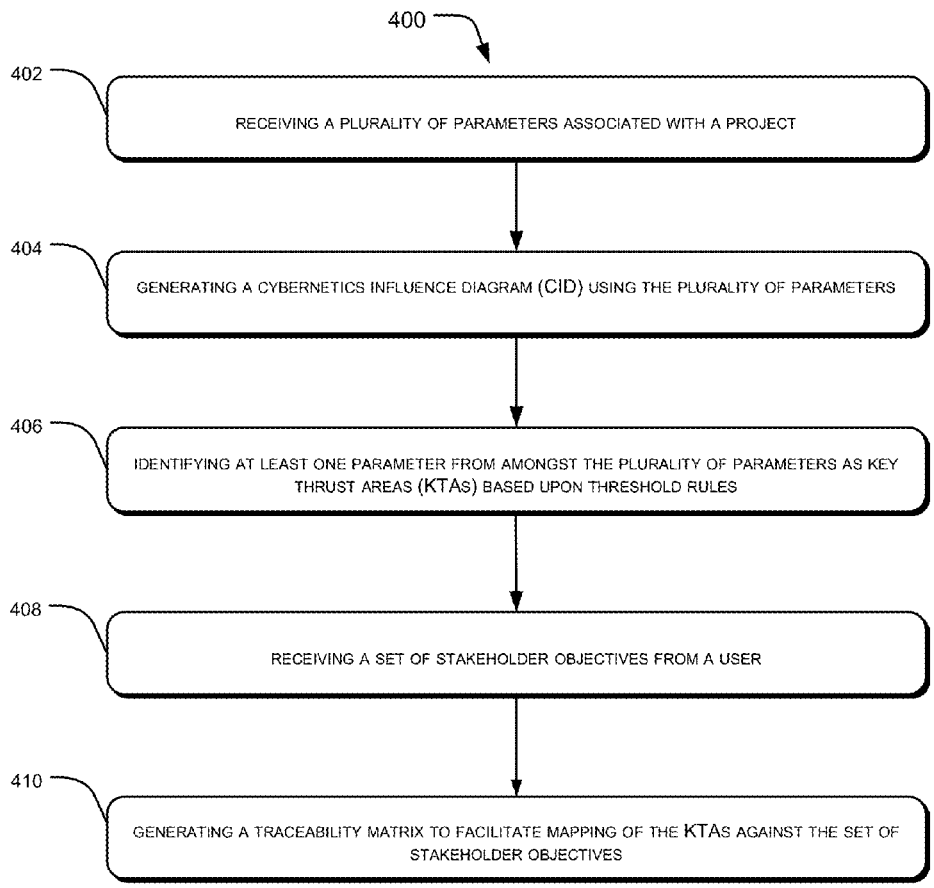
FIG. 4 shows a flowchart illustrating a method for facilitating context understanding for developing a software solution for a project, in accordance with an embodiment of the present subject matter.

Referring now to FIG. 4, a method 400 for facilitating holistic comprehension of a project and simultaneously reducing human effort involved in comprehending such project is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 302.

At block 402, a plurality of parameters associated with a project is received. In one example, the plurality of parameters is received by the I/O interface 310.

At block 404, a cybernetics influence diagram (CID) is generated using the plurality of parameters. The CID is indicative of a relationship of at least one parameter of a plurality of parameters with at least another parameter of the plurality of parameters. In one example, the CID is generated by the cybernetics module 318.

At block 406, at least one parameter from amongst the plurality of parameters is indentified as key thrust areas (KTAs) based upon threshold rules. The threshold rules are based upon the relationship of the parameters with one another. In one example, the KTAs are identified by the cybernetics module 318.

At block 408, a set of stakeholder objectives is received from a user. The set of stakeholder objectives is associated with the project. In one example, the set of stakeholder objectives is received by the framework generating module 322.

At block 410, a traceability matrix template is generated to facilitate mapping of the KTAs against the set of stakeholder objectives. In one example, the traceability matrix template is generated by the matrix generating module 322.

Although implementations for methods and systems for facilitating holistic comprehension of a project and simultaneously reducing human effort involved in comprehending such project have been described in language specific to structural features and/or methods, it is to be understood that the appended claims are not necessarily limited to the specific features or methods described. Rather, the specific features and methods are disclosed as examples of implementations such system.

We claim:

1. A system for facilitating context understanding for developing a software solution for a project, the system comprising:
   a processor;
   an input/output (I/O) interface coupled to the processor and to receive a plurality of parameters associated with the project; and
   a memory coupled to the processor and to the I/O interface, the memory comprising:
      a cybernetics module stored in the memory and executable by the processor and to
         generate a cybernetics influence diagram (CID) using the plurality of parameters, wherein the CID is indicative of an influence of at least one parameter of the plurality of parameters on at least one other parameter of the plurality of parameters;
         identify, based on the CID, merge points as one or more parameters, from the plurality of parameters, that are influenced by at least three other parameters;
         identify, based on the CID, burst points as one or more parameters, from the plurality of parameters, that influence at least two other parameters; and
         determine key thrust areas (KTAs) by grouping the merge points and the burst points;
      a framework generating module stored in the memory and executable by the processor and to
         generate a stakeholder framework associated with the project based upon user inputs, wherein the stakeholder framework is indicative of at least one of stakeholders involved in the project, needs of the stakeholders, alterables associated with the project, and constraints associated with the project; and
         derive a set of stakeholder objectives based on the stakeholder framework, wherein the set of stakeholder objectives is for the project; and
      a matrix generating module stored in the memory and executable by the processor and to generate a traceability matrix template to map each of the KTAs against each stakeholder objective from the set of stakeholder objectives.

2. The system of claim 1, wherein the cybernetics module receives influences between parameters of the plurality of parameters from a user in order to generate the CID.

3. The system of claim 1, wherein the matrix generating module maps each of the KTAs against each stakeholder objective from the set of stakeholder objectives in the traceability matrix template based on mapping rules.

4. A method for facilitating context understanding for developing a software solution for a project using a computing device having a processor, the method comprising:
   receiving, by the processor, a plurality of parameters associated with the project;
   generating a cybernetics influence diagram (CID) using the plurality of parameters, wherein the CID is indicative of an influence of at least one parameter of the plurality of parameters on at least one other parameter of the plurality of parameters;
   identifying, based on the CID, merge points as one or more parameters, from the plurality of parameters, that are influenced by at least three other parameters;
   identifying, based on the CID, burst points as one or more parameters, from the plurality of parameters, that influence at least two other parameters;
   determining key thrust areas (KTAs) by grouping the merge points and the burst points;
   generating a stakeholder framework associated with the project based upon user inputs, wherein the stakeholder framework is indicative of at least one of stakeholders involved in the project, needs of the stakeholders, alterables associated with the project, and constraints associated with the project;
   deriving a set of stakeholder objectives based on the stakeholder framework, wherein the set of stakeholder objectives is for the project; and
   generating a traceability matrix template to map each of the KTAs against each stakeholder objective from the set of stakeholder objectives.

5. The method of claim 4, further comprising mapping each of the KTAs against each stakeholder objective from the set of stakeholder objectives in the traceability matrix template based on mapping rules.

6. A non-transitory computer-readable medium having embodied thereon a computer program for executing a method for facilitating context understanding for developing a software solution for a project, the method comprising:

receiving a plurality of parameters associated with a project;

generating a cybernetics influence diagram (CID) using the plurality of parameters, wherein the CID is indicative of an influence of at least one parameter of the plurality of parameters on at least one other parameter of the plurality of parameters;

identifying, based on the CID, merge points as one or more parameters, from the plurality of parameters, that are influenced by at least three other parameters;

identifying, based on the CID, burst points as one or more parameters, from the plurality of parameters, that influence at least two other parameters;

determining key thrust areas (KTAs) by grouping the merge points and the burst points;

generating a stakeholder framework associated with the project based upon user inputs, wherein the stakeholder framework is indicative of at least one of stakeholders involved in the project, needs of the stakeholders, alterables associated with the project, and constraints associated with the project;

deriving a set of stakeholder objectives based on the stakeholder framework, wherein the set of stakeholder objectives is for the project; and generating a traceability matrix template to map each of the KTAs against each stakeholder objective from the set of stakeholder objectives.

7. The non-transitory computer-readable medium of claim 6, further comprising a computer program for mapping each of the KTAs against each stakeholder objective from the set of stakeholder objectives in the traceability matrix template based on mapping rules.

8. The system of claim 1, wherein the framework generating module receives a set of stakeholder objectives from a user.

9. The method of claim 4, further comprising receiving a set of stakeholder objectives from a user.

10. The non-transitory computer-readable medium of claim 6, further comprising a computer program for receiving a set of stakeholder objectives from a user.

* * * * *